(12) United States Patent
Lawson

(10) Patent No.: US 6,189,976 B1
(45) Date of Patent: Feb. 20, 2001

(54) SPREADER PAN FOR A GRAVITY DISCHARGE TRAILER BOX

(75) Inventor: Tom Lawson, Channahon, IL (US)

(73) Assignee: L&M Manufacturing, Inc., Monmouth, IL (US)

( * ) Notice: Under 35 U.S.C. 154(b), the term of this patent shall be extended for 0 days.

(21) Appl. No.: 09/358,601

(22) Filed: Jul. 21, 1999

(51) Int. Cl.[7] ........................................ B60P 1/00
(52) U.S. Cl. ..................... 298/1 B; 298/7; 298/22 R; 298/23 MD
(58) Field of Search ................ 193/4, 5, 17; 222/610; 298/1 B, 7, 12, 22 R, 25, 23 MD

(56) References Cited

U.S. PATENT DOCUMENTS

| | | | |
|---|---|---|---|
| 165,632 | * | 7/1875 | Thompson . |
| 701,320 | * | 6/1902 | Fisher . |
| 3,977,718 | * | 8/1976 | Nordberg . |
| 4,699,428 | * | 10/1987 | Vick . |
| 4,989,918 | * | 2/1991 | Biddy . |
| 5,823,630 | * | 10/1998 | Graham . |

\* cited by examiner

*Primary Examiner*—D. Glenn Dayoan
*Assistant Examiner*—Scott Carpenter
(74) *Attorney, Agent, or Firm*—Ernest Kettelson

(57) ABSTRACT

This invention comprises a laterally extending spreader pan having a short longitudinal dimension of about six inches, pivotally mounted on a lateral shaft secured to a trailer or truck box adjacent to the rear edge of the box floor. The spreader pan is pivotable between an operating position where the pan is substantially co-planar with the floor of the truck or trailer box and a non-operating position where the spreader pan is pivoted downward to a position that is substantially normal to the box floor and which does not extend beyond the rear edge of the truck or trailer box. An operating lever is provided on the lateral shaft with the free end of the lever connected to the plunger of a pneumatic cylinder controlled from the cab of the truck. When the plunger is extended the shaft and spreader pan is rotated or pivoted upwardly into its operating position, co-planar with the floor of the box. When the plunger is retracted the shaft and spreader pan is rotated downwardly into its out of the way, non-operating position.

10 Claims, 5 Drawing Sheets

SPREADER PAN FOR A GRAVITY DISCHARGE TRAILER BOX

FIELD OF THE INVENTION

This invention relates to the field of gravity discharge trucks and trailers, commonly referred to as dump trucks, wherein the front end of the box is raised and the load slides out by gravity through an opening in the rear wall of the truck or trailer box. In particular, the invention relates to a rotatable extension member or spreader pan adjacent the rear of the truck box which can be rotated into co-planar relationship with the box floor to provide a longitudinal extension which more evenly spreads the contents during unloading, and which can be rotated downwardly after unloading to avoid violating length restrictions that would be applicable if the extension member remained in its longitudinally extended position during travel on the public highways.

BACKGROUND OF THE INVENTION

Prior art dump trucks and trailers have a problem when discharging their loads by raising the front end of the box to slide the contents out the rear by gravity. An extension is needed to carry the discharging material farther from the rear edge of the truck or trailer box but that means either shortening the truck or trailer box itself to stay within the highway length restrictions or doing without such extension from the rear edge of the box. The solution is the rotatable spreader pan or extension member in accordance with this invention, which can be pivoted to its extension position for unloading and then pivoted downward out of the way after unloading so the overall length of the truck or trailer is no greater than without an extension and is still within the highway limits.

SUMMARY OF THE INVENTION

This invention comprises a spreader pan having a longitudinal dimension of about six inches and a lateral dimension of about eighty-nine inches, with partially sloping side walls along each opposite edge about two inches high at the forward edge and about one inch high at the rearmost edge. The spreader pan is pivotally mounted on a lateral shaft secured to the trailer or truck box adjacent to the rear edge of the box floor, and pivotable between an operating position where the pan is substantially co-planar with the floor of the truck or trailer box and a non-operating position where the spreader pan is pivoted downward to a position that is substantially normal to the box floor and which does not extend beyond the rear edge of the truck or trailer box. An operating lever is provided on the lateral shaft with the free end of the lever connected to the plunger of a pneumatic cylinder controlled from the cab of the truck. When the plunger is extended the shaft and spreader pan is rotated or pivoted upwardly into its operating position, co-planar with the floor of the box. When the plunger is retracted the shaft and spreader pan is rotated downwardly into its out of the way, non-operating position.

DESCRIPTION OF PREFERRED EMBODIMENT

Figure 1:
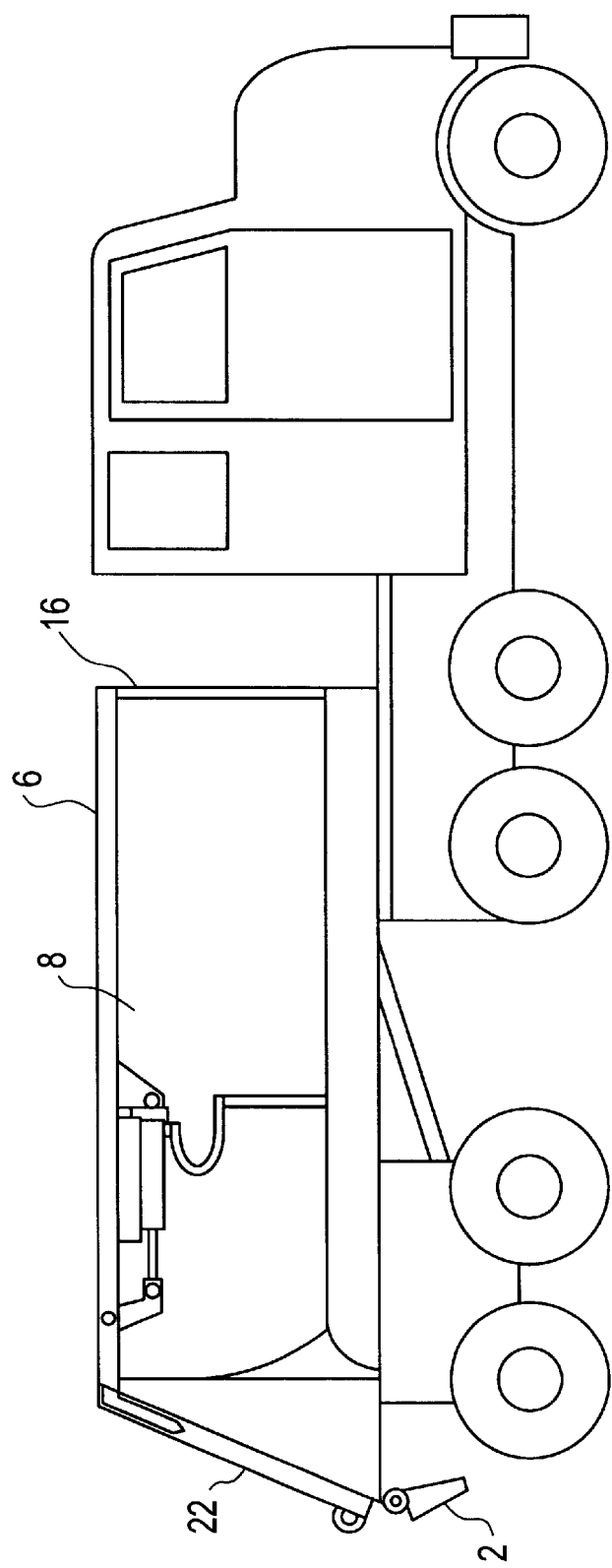
FIG. 1 is a side elevation view of a semi-truck and trailer combination wherein the front end of the trailer box is liftable to discharge the contents by gravity when the tailgate is raised, and having a spreader pan in accordance with the present invention mounted at the rear shown rotated to its downward position.
Figure 2:
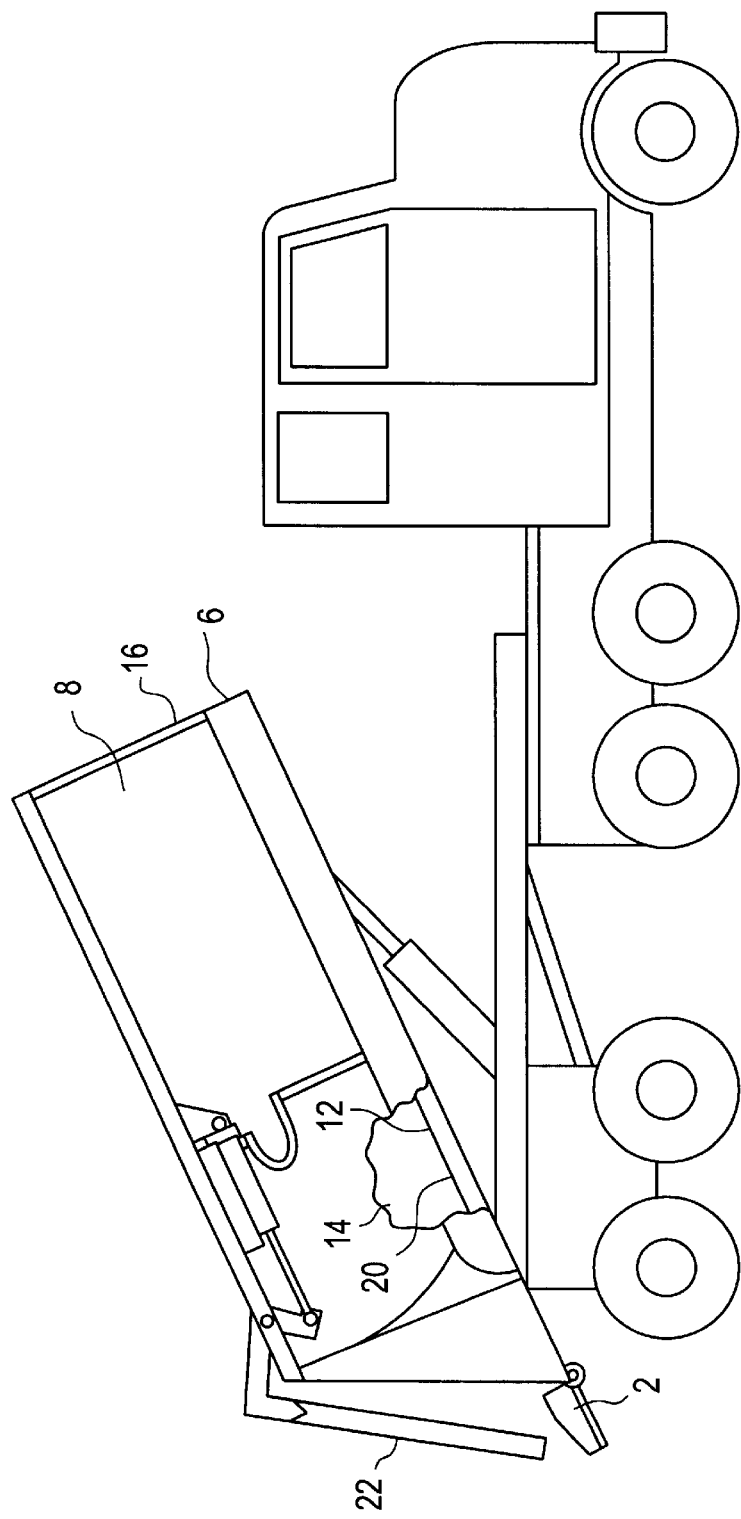
FIG. 2 is a side elevation view of the semi-truck and trailer shown in FIG. 1 with the trailer box lifted to the load dumping position and with the spreader pan rotated to its upper or working position wherein its floor is in planar alignment with the floor of the trailer box; a portion of the side wall of the trailer box is broken away to show the interior cavity of the box and the trailer box floor.
Figure 3:
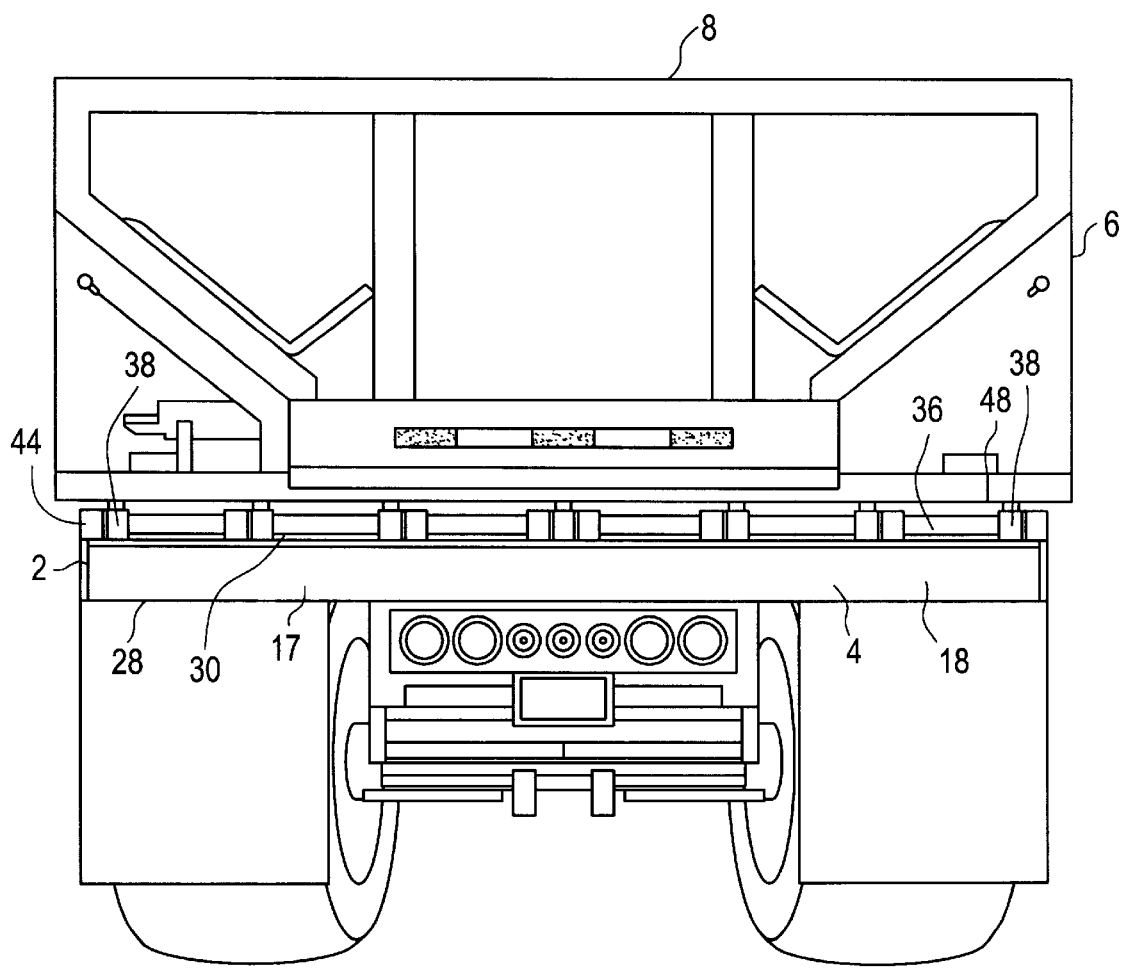
FIG. 3 is a rear elevation view of the semi-truck and trailer combination shown with the spreader pan in its lowered position.
Figure 4:
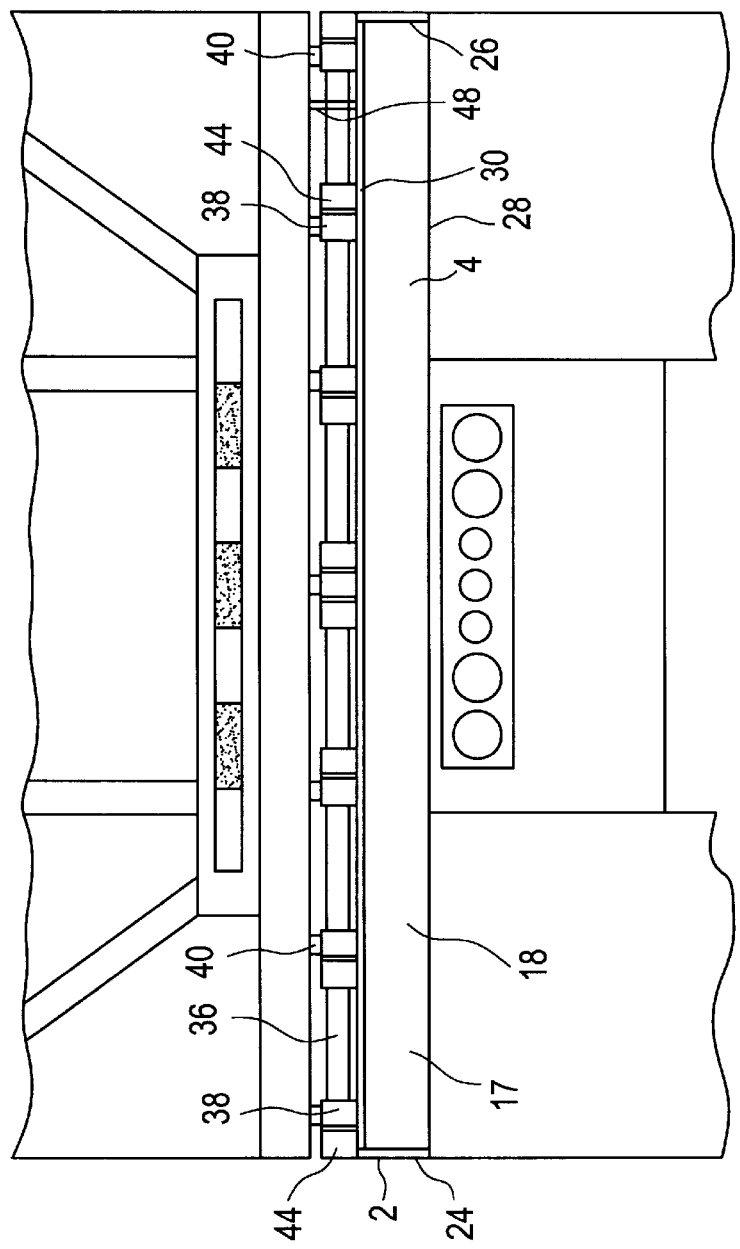
FIG. 4 is an enlarged rear elevation view of the semi-truck and trailer combination of FIG. 3 to better illustrate some of the smaller parts, and with portions above and below broken away.
Figure 6:
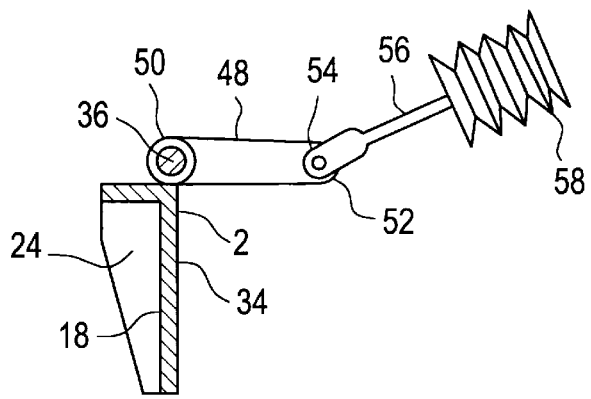
FIG. 6 is an elevation view of the pneumatic cylinder connected to the operating lever which pivots the spreader pan between its raised and lowered positions, wherein the spreader pan is shown in section as is the cylindrical shaft on which the spreader pan is rotatably mounted.
Figure 5:
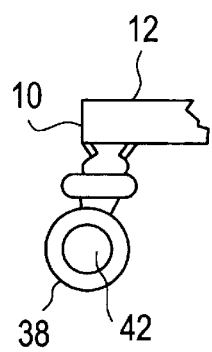
FIG. 5 is a fragment of the floor and rear portion of the trailer box showing one of the sleeves welded thereto which rotatably receives the cylindrical shaft on which the spreader pan pivots between its raised or working position and its lowered out-of-the way position.
Figure 7:
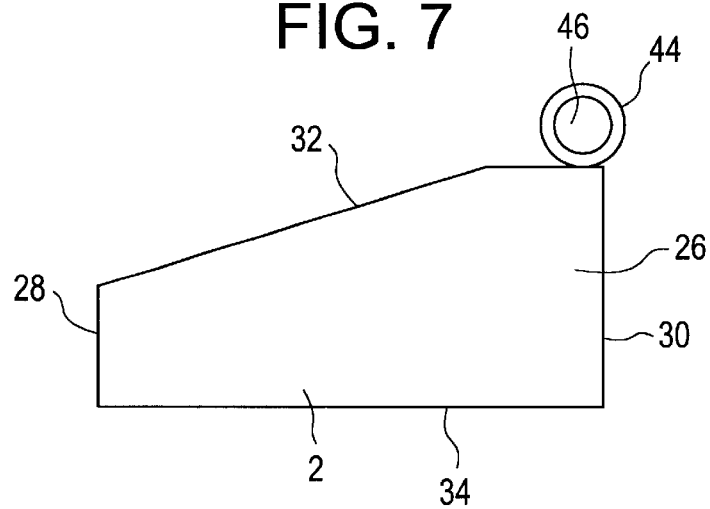
FIG. 7 is an enlarged side elevation view of the spreader pan disconnected from the trailer box.

A pivotable spreader pan 2 in accordance with this invention comprises a longitudinally short extension member 4 to extend the longitudinal floor surface of a dump trailer 6 of the semi-truck and trailer type when a load of material is being dumped that is to be spread evenly while the truck is moving forward as the load is being discharged from the cargo hold of the trailer box 8. The spreader pan 2 is pivotally mounted to the rear edge 10 of the floor 12 of the cavity 14 of the trailer box 8, and is normally pivoted downwardly when the trailer box 8 is in its lowered position. When the front end 16 of the trailer box 8 is to be raised for unloading, the spreader pan 2 is rotated or pivoted upward from its lowered position to its operating position in line with the floor 12 of the trailer box 8.

The spreader pan 2 comprises a laterally extending floor 17 having a dimension that corresponds to the lateral dimension of the floor 12 of the cavity 14 of the trailer box 8. In a preferred embodiment the lateral dimension of the spreader pan floor 12 is eighty-nine inches. The longitudinal dimension of the floor 12 in a preferred embodiment is six inches. When the spreader pan 2 is rotated upwardly to its operating position, its floor surface 18 is co-planar with the floor surface 20 of the trailer box floor 12, and its lateral surface is co-extensive with the lateral surface of the floor 12 of the trailer box 8. The front end 16 of the trailer box 8 is raised and the tailgate 22 is opened to unload the contents from the trailer box. The spreader pan 2 rotated upward to its operating position provides an extension for the contents of the trailer box 8 to slide over when being unloaded, thus enabling a more even and uniform spread as the material slides out onto the ground while the semi-trailer moving forward.

The spreader pan 2 includes a first side wall 24 bordering one side edge and a second side wall 26 bordering the opposite side edge. Each side wall has a longitudinal dimension corresponding to the longitudinal dimension of the spreader pan floor surface 18, such as six inches in a preferred embodiment. The outermost edge 28 of each side wall extends upwardly or vertically from the floor about one inch. The opposite innermost edge 30 of each side wall extends upwardly or vertically from the floor about two inches. The top edge 32 of each side wall extends from the innermost edge 30 toward the outermost edge 28 for about one inch parallel to the bottom edge 34 and floor surface 18, and then slopes downwardly to terminate at its junction with the outermost edge 28 of the respective side walls.

The spreader pan 2 is pivotally mounted at the rear edge of the trailer box 8 as follows. A laterally extending cylindrical shaft 36 is supported along the rear edge of the trailer box 8 by a plurality of cylindrical bearing members or trailer box sleeves 38 secured to the rear edge of the trailer box 8 at spaced apart locations by connecting tabs 40 which are welded, bolted or otherwise secured to the trailer. Each of the supporting sleeves have a cylindrical bore 42 corresponding in diameter to that of the shaft 36 which is received therethrough. The spreader pan 2 includes a plurality of spaced apart cylindrical bearing members or spreader pan sleeves 44 which have a cylindrical bore 46 which also corresponds in diameter to that of the shaft 36 which is received therethrough to pivotally connect the spreader pan 2 to the rear edge of the trailer box 8. The spreader pan sleeves 44 are secured to the shaft 36 to rotate therewith. The shaft 36 is free to rotate within the trailer box sleeves 38.

An operating lever 48 is affixed to the shaft 36 near the right hand side or curb side thereof when in place at the rear edge of the trailer box 8. The operating lever 48 is a little over seven inches in length in a preferred embodiment from its affixed end 50 to its free end 52. The outer end 54 of the plunger 56 of a pneumatic cylinder 58 is connected to the free end 52 of the operating lever 48. The pneumatic cylinder 58 is connected to a source of compressed air for extension and retraction of the plunger 56. When the plunger 56 is in its retracted position, the operating lever 48 moves the spreader pan 2 to its downward position whereby the floor of the trailer box 8 is not lengthened. When the plunger 56 is moved toward its extended position as compressed air is supplied to the pneumatic cylinder 58, the operating lever is moved downwardly which rotates the spreader pan 2 upwardly until its floor surface 18 is co-planar with the floor surface 20 of the trailer box floor 12. The spreader pan 2 is then in its operating position, whereupon the front end 16 of the trailer box 8 can be raised and the tailgate 22 opened to unload and spread the contents from the trailer box.

What is claimed is:

1. A spreader extension and gravity discharge box in combination, comprising a gravity discharge box having a floor, a rearward edge of said floor, a forward end wall, a first side wall, an opposite second side wall, and an open rearward end wall having a tailgate pivotally mounted for pivotal movement between an open position and a closed position, said tailgate having a lower edge, said lower edge being adjacent said floor and in closing relationship with said rearward end wall when said tailgate is pivoted to its said closed position, said lower edge being pivoted outwardly from said rearward end wall and upwardly from said floor when said tailgate is pivoted toward its said open position, said forward end of said discharge box being liftable to an unloading position to slide contents thereof out through said open rearward end wall when said tailgate is pivoted toward said open position, spreader extension means for extending the surface area over which said contents slide after passing through said open rearward end wall located adjacent said rearward edge of said floor of said gravity box, wherein said spreader extension means includes a laterally extending member having a planar upwardly facing sliding surface substantially co-planar with said floor of said gravity box, wherein said laterally extending member adjacent said rearward edge of said floor of said gravity box is mounted for rotation between a first position wherein it extends rearwardly from and substantially co-planar with said floor of said gravity box and a second position wherein it extends downwardly relative to said floor of said gravity box.

2. A spreader extension and gravity discharge box in combination as set forth in claim 1, including, rotation mounting means comprising a laterally extending pivot member positioned adjacent said rearward edge of said floor of said gravity box, said laterally extending member having a laterally extending forward edge adjacent to and substantially parallel to said rearward edge of said floor of said gravity box, connecting means on said laterally extending forward edge of said laterally extending member to rigidly secure said laterally extending pivot member to said laterally extending pivot member, and hinge means on said gravity box pivotally received on said laterally extending pivot member for rotation thereon.

3. A spreader extension and gravity discharge box in combination as set forth in claim 2, wherein said laterally extending pivot member comprises a cylindrical shaft, said hinge means comprises a plurality of spaced apart sleeve members, said cylindrical shaft being received through said spaced apart sleeve members.

4. A spreader extension and gravity discharge box in combination as set forth in claim 3, wherein said connecting means on said laterally extending forward edge of said laterally extending member comprises a plurality of spaced apart collar members each having a peripheral wall extending around and secured to said cylindrical shaft for pivotal movement of said laterally extending member when said cylindrical shaft is rotated.

5. A spreader extension and gravity discharge box in combination as set forth in claim 4, including an operating lever having a first end rigidly secured to said cylindrical shaft and a second free end extending from said cylindrical shaft in the direction toward said gravity box, a pressure receptive cylinder mounted adjacent said gravity box having a plunger reciprocally movable between a retracted and extended position, said plunger being connected to said free end of said operating lever for rotating said cylindrical shaft and said laterally extending member between said first position wherein it extends rearwardly from and substantially co-planar with said floor of said gravity box when said plunger is extended and said second position wherein said laterally extending member extends downwardly relative to said floor of said gravity box when said plunger is retracted.

6. A spreader extension and gravity discharge box in combination as set forth in claim 5, wherein said pressure receptive cylinder is a pneumatic cylinder.

7. A spreader extension and gravity discharge box in combination as set forth in claim 5, wherein said laterally extending member includes a first side wall and an opposite second side wall, said laterally extending member having a lateral dimension of about eighty-nine inches and a longitudinal dimension of about six inches.

8. A spreader extension and gravity discharge box in combination as set forth in claim 7, wherein each of said first and second side walls have a forward vertical edge with a dimension of about two inches adjacent said laterally extending forward edge of said laterally extending member.

9. A spreader extension and gravity discharge box in combination as set forth in claim 8, wherein said laterally extending member includes a laterally extending rearward edge, each of said first and second side walls have a rearward vertical edge with a dimension of about one inch adjacent said laterally extending rearward edge of said laterally extending member, each of said first and second side walls having an upper edge which extends from said forward vertical edge rearwardly on a line substantially parallel to said planar surface of said laterally extending member for about one inch and then slopes downwardly to terminate at the upper end of said rearward vertical edge.

10. A spreader extension and gravity discharge box in combination as set forth in claim 9, wherein said gravity box comprises a trailer of a semi-truck and trailer combination.

* * * * *